United States Patent
Shipley et al.

(10) Patent No.: US 7,590,624 B2
(45) Date of Patent: Sep. 15, 2009

(54) PROCESS FOR IDENTIFYING DUPLICATE VALUES IN VERY LARGE DATA SETS

(75) Inventors: Gerald L. Shipley, Hillsboro, OR (US); David A. Castaneda, Clakamas, OR (US)

(73) Assignee: LSI Corporation, Milpitas, CA (US)

( * ) Notice: Subject to any disclaimer, the term of this patent is extended or adjusted under 35 U.S.C. 154(b) by 607 days.

(21) Appl. No.: 11/225,309

(22) Filed: Sep. 12, 2005

(65) Prior Publication Data

US 2007/0071240 A1    Mar. 29, 2007

(51) Int. Cl.
*G06F 17/30* (2006.01)
(52) U.S. Cl. .................... 707/3; 707/2; 707/7
(58) Field of Classification Search .......... 707/1, 707/7, 2, 3
See application file for complete search history.

(56) References Cited

U.S. PATENT DOCUMENTS

| | | | |
|---|---|---|---|
| 5,855,016 A * | 12/1998 | Edem et al. ............... 707/7 |
| 6,775,682 B1 * | 8/2004 | Ballamkonda et al. ...... 707/102 |
| 2003/0037051 A1 * | 2/2003 | Gruenwald ................. 707/7 |
| 2004/0205343 A1 * | 10/2004 | Forth et al. ................ 713/168 |
| 2005/0108230 A1 * | 5/2005 | Carroll ....................... 707/7 |
| 2005/0157724 A1 * | 7/2005 | Montuno et al. ........... 370/392 |

OTHER PUBLICATIONS

C.P. Schnorr, A. Shamir, An Optimal Sorting Algorithm, For Mesh Connected Computers, ACM 1986, p. 255-263.*

* cited by examiner

*Primary Examiner*—Hosain T Alam
*Assistant Examiner*—Amy Ng
(74) *Attorney, Agent, or Firm*—Beyer Law Group LLP

(57) ABSTRACT

The present invention is directed to a method of identifying duplicate data elements in large data sets. This involves receiving the data sets. Dividing each data element in the data set into a series of data segments to define data keys. Generating an intermediate value for the each element in the data set using summed values for the data keys. Sorting the data entries using the intermediate values. Sorting the matched intermediate value entries using the data keys. Identifying the duplicate data elements in the data set.

17 Claims, 3 Drawing Sheets

US 7,590,624 B2

PROCESS FOR IDENTIFYING DUPLICATE VALUES IN VERY LARGE DATA SETS

FIELD OF THE INVENTION

The invention described herein relates generally to methods and processes used for verifying the uniqueness of every data element in a set of data elements. In particular, the present invention relates to methods, processes, and data structures used to sort through data sets at an accelerated rate to identify duplicate data elements.

BACKGROUND OF THE INVENTION

The inventors are aware that large lists or sequences of data elements are commonly generated for many applications. Modernly, the use and popularity of encryption codes has made the generation large sequences of unique numbers an important objective. Commonly, the generation of lists of unique numbers is accomplished using random number generation algorithms or other related processes. However, as is known to those of ordinary skill in the art, such algorithms are not perfect in their generation of completely random data sets having no duplicate values. Each data set must be meticulously checked for the presence and frequency of duplicate values.

On its surface, the task of checking for the presence of duplicate values does not appear too daunting. On the other hand, the data elements themselves are becoming larger and larger. This makes such checking an increasingly time intensive process. This is especially the case when checking the 256-bit and larger data elements coming into common usage. When this increasing data element size is coupled with the fact that data sequences comprising millions or even hundreds of millions of data elements (or more) are now being used, the task of finding duplicates becomes much more difficult and time consuming. In fact, using present methods and technologies, searching such lists to determine if duplicate values are present is a massive undertaking. Even networked computing systems can take as long as a month to identify duplicate data elements in a data set of 100 million data elements. Even using relatively fast processing languages (e.g., $C^{++}$, Assembly, and the like) such duplicate value searches can take many days to identify duplicate data elements.

Among the present methods in use for detecting duplicate values is a single match sorting algorithm. This method begins with the first data element in the data set and then compares it with every other element in the data set. If there is no match, the data element is identified as unique. The next data element is then searched in a similar fashion. In data sets of many millions of data elements this can take days or even weeks. In other word the process can be so time consuming as to be completely prohibitive. Another present approach requires that each data element be read and sorted into a "bin". Bins having more than one data element contain duplicate data elements. In such an approach every data element must be completely sorted and then put in a bin. This is also a very time consuming process, especially so when large data elements are used (128-bit, 256-bit, and larger data elements). The process is made even more time consuming when one considers that even the fastest and most powerful computers in usage today use 64-bit logic which can only slowly process larger word sizes (e.g., 128-bit words and larger). Thus, these restrictions are even more burdensome when one considers that a typical computer uses 32-bit word sizes. Consequently, both of these common sorting approaches are slow and inefficient for sorting large data sets having large size data elements.

Additionally, when sequences of data elements are generated, it is important to know where in the sequence each duplicate value is. This information can, for example, help to troubleshoot the random number generation algorithms used to generate the data values. Thus, there is also a need for methods of tracking the position of duplicate data elements in a data set.

With each new set of data encryption codes for credit cards, bank accounts, e-mail accounts, financial transaction codes, and every other manner of encrypted data, the need for large data sets with non-duplicate data elements is becoming ever more important. This increases the necessity for testing of the data sets. Also it is important that such testing for duplicate data values be performed rapidly.

The inventors have recognized that there is a need for improving existing search methods. The invention described herein discloses method and apparatus for enabling faster and more complete searches to be performed using larger and larger data sets having larger data elements.

SUMMARY OF THE INVENTION

The principles of the present invention disclose a method for identifying duplicate values in large data sets.

In one embodiment, the invention describes a method for determining if a data set includes duplicate data elements. The method involves the operations of providing a data set having many data elements. Each data element is divided into data segments that define data keys. Intermediate values are determined for each data key. Then, the data keys are sorted using at least the intermediate data values to identify duplicate data elements.

In one particular embodiment, the method of the invention describes a method for sorting that includes summing the intermediate values for each data element in the data set. The data elements are then sorted by summed intermediate values. Those elements having no duplicate summed intermediate values are determined to be unique and not processed further. Some data elements may have intermediate values that are the same as some other data elements. These are potential duplicates that are searched by data key values until they are identified as unique or identified as true duplicates. A data key search is performed on each data element having the same intermediate value. As soon as a data key is found that does not match the data keys of the other potential duplicates having the same intermediate value it is identified as unique and no further processing is performed on that element. This continues until all data elements in the set are processed. Where duplicates are identified there location (e.g., sequence number) in that data set is identified and saved for further analysis.

In another embodiment the invention describes a computer program product having computer program code for determining if the data of a data set includes duplicate data elements. The program includes instructions for receiving a set of data elements and dividing each data element into N data segments defining N data keys for each data element. The instructions obtain intermediate data values for each of the data elements and sort the data elements using at least the intermediate data values. The program including instructions for identifying the duplicate data elements. In a related embodiment both the intermediate data values and the data keys are used to identify duplicate data elements. In another embodiment, a computer system using the above described computer program product is used to identify duplicate data elements in a data set.

These and other features and advantages of the present invention are described below with reference to the drawings.

BRIEF DESCRIPTION OF THE DRAWINGS

The following detailed description will be more readily understood in conjunction with the accompanying drawings, in which.

It is to be understood that, in the drawings, like reference numerals designate like structural elements.

DETAILED DESCRIPTION

The present invention has been particularly shown and described with respect to certain embodiments and specific features thereof. The embodiments set forth hereinbelow are to be taken as illustrative rather than limiting. Moreover, it should be readily apparent to those of ordinary skill in the art that various changes and modifications in form and detail may be made without departing from the spirit and scope of the invention.

In general terms the following discussion concerns methods, apparatus, and computer program products for determining whether a data set contain duplicate data elements. In one general approach, each data element of the data set is processed to obtain data keys. The data keys being defined by the data segments of the larger data element. The data segments of each data element can be configured so that the segments for each element are the same size as each other data element in the set. These data segments are used to define data keys. The values of each key in a data element are summed together to generate an intermediate value associated with the data element. The data elements are sorted by their intermediate values. Data elements having no duplicate intermediate values are defined as unique and no further operations are performed on data elements identified as unique. Other data elements having matching intermediate values are potential duplicate data elements. These potential duplicates are searched by individual data keys. As each potential duplicate data element fails to find a matching data key, it is identified as unique and no further searching is performed on the potential duplicate data element. This process continues until each of the data elements are determined to be unique or until all of the duplicate data elements are found (i.e., all data elements that have the same values for all data keys are found and are therefore identified as duplicate data elements).

The inventors have previously observed that in certain known methods of searching for duplicate values, a computer accesses the first value in the set and then searches every other value in the set for a match. This value, once confirmed as un-duplicated is then eliminated from further searches. The same process is then performed on next value in the set. This process is repeated for each element in the data set. As is readily apparent, with larger data values in data sets running into the hundreds of millions and more this process takes a long time. However, using this method, with each passing iteration the process gets a little faster (having fewer data values to search through). Thus, by the time the 75 percent of the data values have been eliminated the process is about four times as fast as it was at the beginning. The inventors have determined that it would be advantageous if the entire sorting process could be performed at this accelerated rate. This disclosure provides methods for accomplishing this goal.

Figure 1:
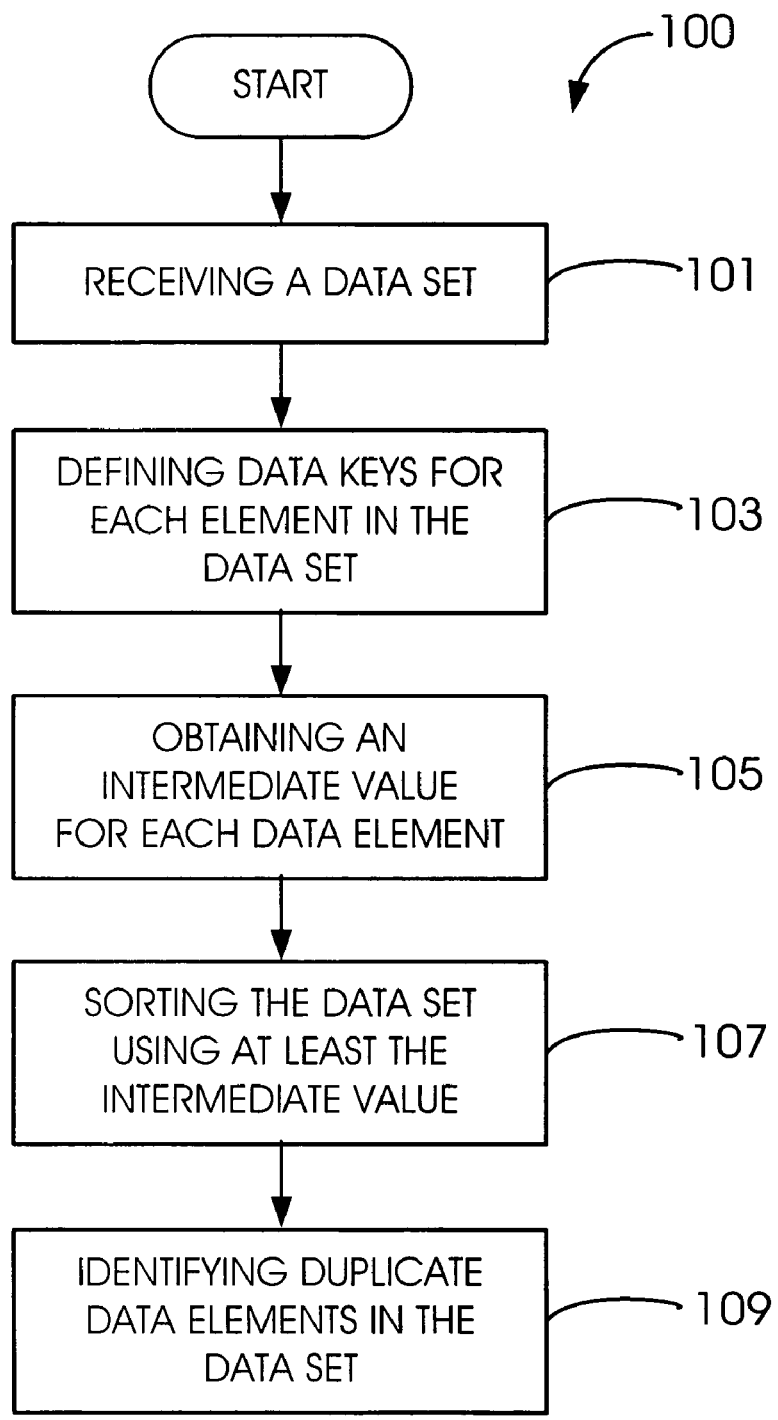
FIG. 1 is a simplified flow diagram illustrating a process flow usable by embodiments of the present invention

FIG. 1 is a simplified flow diagram illustrating one generalized method embodiment for identifying duplicate data elements in a set of data values. The flow diagram 101 begins by receiving data comprising a set of data elements (e.g., a data file). In one embodiment, a received data set comprises a sequence of data entries (also referred to herein a data elements). In one embodiment the data set comprises a series of randomly generated data entries. Such data entries can be generated in accordance with a number of different random number generating processes known to those having ordinary skill in the art. Additionally, the present invention is not necessarily limited to such randomly generated data sets. The inventors contemplate data sets generated in virtually any manner can be sorted and the duplicates found in accordance with the presently described invention. Moreover, the principles of the invention gain greater utility when used with data sets of larger than 1 million entries, with particular utility obtained on data sets having tens, hundreds, or several hundreds of millions of data entries. The inventors also point out that the technologies discussed herein have great utility when applied to even larger data sets (billions of entries or more).

The data entries so processed in accordance with the principles of the invention can range in size from 1-bit entries to 64-bit, 128-bit, 256-bit and larger data entries. Although the data entries processed can be of any size, the principles of the invention are especially well suited to benefit from the advantages presented by modern 32-bit processors. However, the inventors specifically point out that the principles of the invention are not limited to specific size data elements or use with specific types of processors.

Figure 2A:
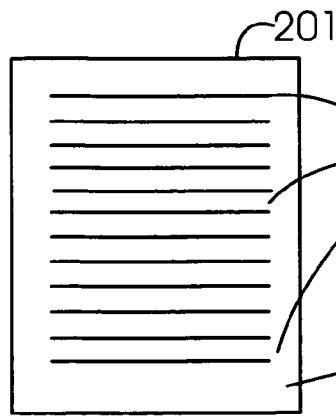
FIG. 2(a) is a simplified schematic depiction of a data set comprising a plurality of data elements.
Figure 2B:
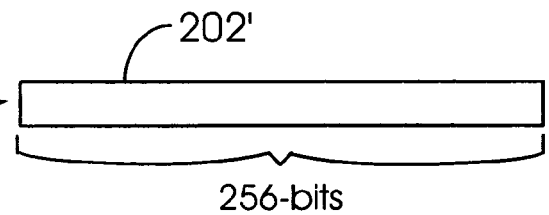
FIG. 2(b) is a simplified schematic depiction of a single data element in a set of data elements.

FIG. 2(a) is a simplified schematic depiction of a data set 201 comprising a multiplicity of data elements 202. This data set 201 can comprise any number of data elements 202 obtained from any source. However, the inventors contemplate that one particularly useful implementation of the principles of the invention is applied to randomly generated data sequences having a series of data elements 202. In the depicted embodiment, one data element 202' is a 256-bit data element. A schematically depicted embodiment of such a data element 202' is shown in the simplified depiction of FIG. 2(b).

Figure 2C:
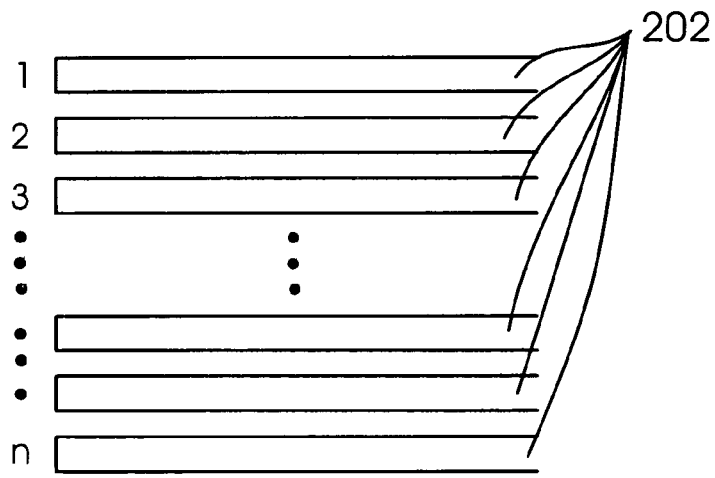
FIG. 2(c) is another simplified schematic depiction of a set of data elements in a set of data elements.

FIG. 2(c) is another simplified schematic depiction of a portion of data set 201 showing some of data elements 202. This data set 201 is depicted here as comprising a sequence of n data elements 202. Each of these data elements can be read into a processing system (work station, server, or any other processing device). In one implementation, each data element 202 is read into the processing system along with an associated sequence number, which preserves the information on the original position of the data in the data set. Such information may be important in future data analysis. This sequence information can be used to analyze the data as needed. For example, the data can later be used to troubleshoot the algorithms that generated the data.

Once the data set 201 is read by the processing computer system the method engages in identifying duplicate data entries in the data set. Referring again to FIG. 1, in operation defined by Step 103, data keys are defined for each data entry in the data set. In one implementation, this is accomplished by breaking each of the data entries 202 into a series of N data segments.

Figure 2D:
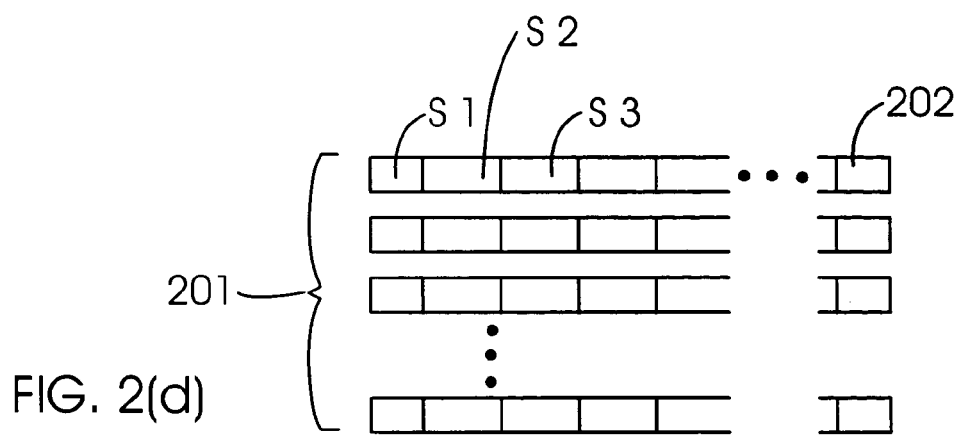
FIG. 2(d) is a simplified schematic depiction of a set of data elements in a set of data elements with each element having a series of data segments defining data keys for each element.

One such process is schematically depicted in FIG. 2(d). FIG. 2(d) is a simplified depiction of some data elements (data entries) 202 of a data set 201. In Step 103 each data element 202 is divided into separate data segments (e.g., S1, S2, S3, and so on) which define data keys. The data segments can be of any size. The only limitation is that each of the data elements are to be segmented in the same pattern each of the other data elements in the data set. For example, if each data element is a 256-bit "word" and the first data element is segmented into sixteen 16-bit segments, then all of the other data elements in the data set are also similarly divided into sixteen 16-bit segments. The data segments need not all be the same size, all that is required is that the pattern of segments be the same for each data element. In another example, the first eight segments can be 16-bit segments with a single 128-bit segment as the last segment. These segments define the data keys.

With continued reference to FIG. 1, an intermediate value for each data element is obtained (Step 105). In one embodiment, the intermediate value is obtained by summing values for each data segment together to obtain a summed value for all of the data segments. In one embodiment the summed value is an integer value the summed data segments. This summed value is the intermediate data value.

The inventors point out that the intermediate value can alternatively be obtained by summing the values of the entire data element prior to segmenting the data element. In some implementations, this may even be the preferred approach. Also, all such summed values can be converted into a decimal (base ten) integer value if desired or maintained in a binary format if desired. As is readily appreciated by those of ordinary skill, other bases could be used if desired.

Returning to FIG. 1, the data elements are sorted using at least the intermediate values for each data element (Step 107). First, the data elements are sorted into groups by intermediate values. All the data elements that have unique intermediate values (i.e., data elements that have no matches for the same intermediate value) are identified as unique data elements. These unique data elements are singular and are not duplicated in the data set. Therefore, no further sorting is required on them. Thus, in this first sort by intermediate data values a sizeable percentage of the data elements are eliminated from further processing. Herein lies one of the advantages of the present invention. The actions of summing and segmenting the data can be performed very quickly by a computer system. This is especially true when compared with sort operations which must be repeated over and over again for each element in the processed data set. Thus, performing these operations up front costs little process time and eliminates many data elements from further processing. This advantage is magnified when one considers the time involved in sorting 256-bit and larger data elements.

After identifying the unique data elements in the above-described preliminary sort operation, the potential duplicate data elements are also identified. For example, each data element having the same summed intermediate value is a potential duplicate of each other data element having the same summed intermediate value. Thus, for each group of data elements having the same intermediate value, a search is performed using the data keys (data elements). For example, in a first group of data elements (elements having the same intermediate value), each data element is searched using a first data key. For those data elements that have whose first data keys do not match any other data keys the search is ended because those data elements are identified as unique. The remaining data elements in the group are still potential duplicate data elements and are searched using a second data key. Again, for those data elements with unmatched second data keys the search is also ended because these data elements are also unique. For the remaining data elements in the group that are still potential duplicate data elements the data key searching continues data key by data key until all duplicate data elements are eliminated as unique or data elements are found that match all of the data keys. These completely matching data elements are duplicate data entries. This process is repeated for each group of entries having matching summed intermediate values. Advantageously, this can all be conducted in a single search pass.

Those data entries having the same intermediate value and matching all the data keys of another data entry are identified as duplicate data entries (Step 109). Additionally, the sequence number of the duplicate data entries can be saved. This is particularly useful when the data sets are used to generate sequences of random numbers. The presence and frequency of a duplicate data elements as well as their position in the sequence can be very helpful in discerning the accuracy of the random number generation algorithms. The inventors point out that the forgoing method is commonly implemented as a computer program product that can be stored on a computer readable media and executed on a device capable of executing computer readable instructions.

Figure 3A:
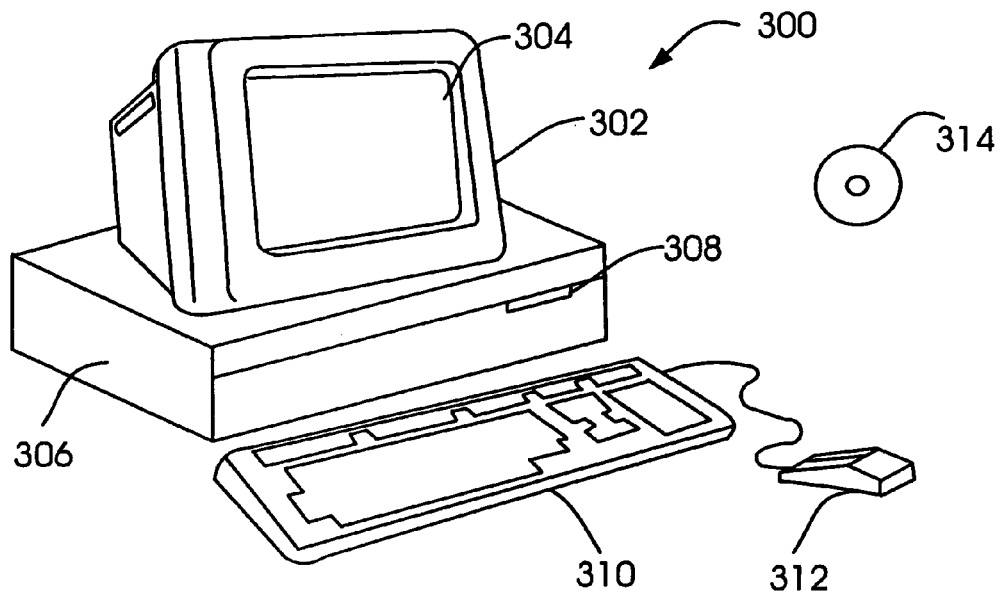
FIGS. 3A and 3B illustrate an example of a computer system that may be used in accordance with the invention.
Figure 3B:
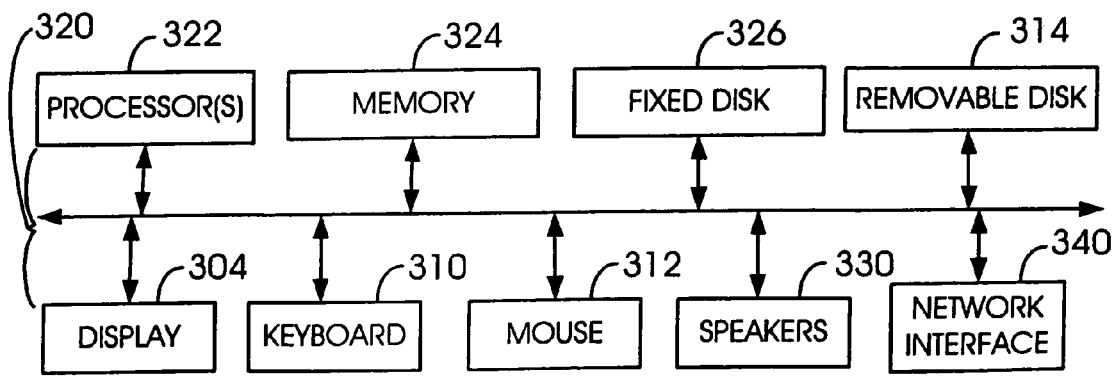

FIGS. 3A and 3B illustrate one non-exclusive example of a computer system 300 that may be used to process data sets in accordance with the invention. FIG. 3A shows a computer system 300 that includes a display 302, screen 304, cabinet 306, keyboard 310, and mouse 312. Mouse 312 may have one or more buttons for interacting with a graphical user interface. Cabinet 306 can house a CD-ROM drive 308, system memory and a hard drive (see FIG. 3B) which may be utilized to store and retrieve software programs incorporating computer code that implements the invention, data for use with the invention, and the like. Although CD-ROM 308 is shown as an exemplary computer readable storage medium, other computer readable storage media including floppy disk, DVD, tape, memory sticks, flash memory, system memory, and hard drive may be utilized. Additionally, a data signal embodied in a carrier wave (e.g., in a network including the Internet) may be the computer readable storage medium. In one implementation, an operating system for the computer system 300 is provided in the system memory, the hard drive, the CD-ROM 308 or other computer readable storage medium and serves to incorporate the computer code that implements the invention. It is to be remembered that the operating system can be configured so it controls all of the processors of the system. It should be noted that other devices (e.g., printers, scanners, etc.) may be present in the computer system 300.

FIG. 3B shows a system block diagram of computer system 300 used to execute the software of an embodiment of the invention. The computer system 300 includes monitor 304, keyboard 310, and mouse 312. Computer system 300 further includes subsystems, such as a plurality of central processors (CPU's) 322 (including cache memory resources), system memory 324, fixed storage 326 (e.g., hard drive), removable storage 314 (e.g., CD-ROM drive), display adapter, sound card and speakers 330, and network interface 340. The network interface can be used to facilitate connection with many different network structures including the Internet. The central processors 331, for example, can execute computer program code (e.g., an operating system) to implement the invention. An operating system is normally (but not necessarily) resident in the system memory 324 during its execution. Other computer systems suitable for use with the invention may include additional or fewer subsystems. Importantly, the principles of the invention can specifically be implemented on networked computer systems having many individual computers. Such networked systems can include local area networks (LAN's) or a wide area network (WAN's). Particularly, the inventors contemplate computer systems and message traffic operating over the Internet. Additionally, an example of a LAN is a private network used by a mid-sized company with a building complex. Publicly accessible WAN's include the Internet, cellular telephone network, satellite systems and plain-old-telephone systems (POTS). Examples of private WAN's include those used by multi-national corporations for their internal information system needs. The network may also be a combination of private and/or public LANs and/or WANs.

The system bus architecture of computer system 300 is represented by arrows 320. However, these arrows are illustrative of any interconnection scheme serving to link the subsystems. For example, a local bus could be utilized to connect the central processor to the system memory and display adapter. Computer system 300 shown in FIG. 3B is but an example of a computer system suitable for use with the invention. Other computer architectures having different configurations of subsystems may also be utilized.

The invention can use a combination of hardware and software components. The software can be embodied as computer readable code (or computer program code) on a computer readable medium. The computer readable medium is any data storage device that can store data which can thereafter be read by a computer system. Examples of the computer readable medium include read-only memory, random-access memory, CD-ROMs, magnetic tape, and optical data storage devices. The computer readable medium can also be distributed over a network coupled computer systems so that the computer readable code is stored and executed in a distributed fashion.

The inventors point out that certain embodiments of the invention provide a number of advantageous features. For example, larger sized data entries (e.g., 128-bit, 256-bit, and larger sized "words") can be broken down into small integer bits and processed at high rates of speed. One such example being breaking the data element into a series of 16-bit decimal integers values which can easily processed by most computers at extremely high rates of speed. Additionally, since fewer sort operations are needed by embodiments of the invention, optimized sort operations like UNIX "sort" commands can be used since there is no need to extract values during the sort. Also, the initial comparison of data elements using the intermediate values eliminates a large portion of data elements without further processing further increasing efficiency. Additionally, after the first sort (by intermediate value) the uniqueness test can be performed as a linear search. Also, the data order in each of the data sets is preserved.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

The present invention has been particularly shown and described with respect to certain embodiments and specific features thereof. However, it should be noted that the above-described embodiments are intended to describe the principles of the invention, not limit its scope. Therefore, as is readily apparent to those of ordinary skill in the art, various changes and modifications in form and detail may be made without departing from the spirit and scope of the invention as set forth in the appended claims. Further, reference in the claims to an element in the singular is not intended to mean "one and only one" unless explicitly stated, but rather, "one or more".

What is claimed is:

1. A method for determining if the data of a data set includes duplicate data elements, the method comprising:
   a) receiving a data set having a plurality of data elements;
   b) dividing each data element into N data segments defining thereby N data keys for each data element;
   c) obtaining intermediate data values for each of the data elements;
   d) sorting the data elements using at least the intermediate data values wherein said sorting includes:
   conducting a first sorting of the data elements using the intermediate value for each data element;
   identifying data elements that have no matching intermediate values as unique data elements;
   identifying data elements having the same intermediate values as other data elements as potential duplicate data elements; and
   searching the potential duplicate data elements using the data keys to determine if any of the potential duplicate data elements match all the data keys wherein the searching comprises:
   1) segregating the potential duplicate data elements into groups of data elements wherein each group is comprised of potential duplicate data elements having a same intermediate value;
   2) beginning with a first group of the groups of data elements; said data key sorting comprises:
      a) comparing a first data key for each data element in the first group;
      b) where the first data key of a data element does not match any other first data keys for the first group of data elements the data element is identified as unique and no further processing is performed on the data element;
      c) where the first data key of a data element matches the first data key of another data element of the first group, the data element remains identified as a potential duplicate data element and further processing is performed on the data element;
      d) the remaining potential duplicate data elements are subject to further processing as follows:
         i) comparing a next data key for each potential data element in the first group, where the potential duplicate data element does not match any of the next data keys for the potential duplicate data elements of the first group of data elements, the potential duplicate data element is identified as unique and no further processing is performed on the data element; and
         ii) if the next data key of the potential duplicate data element does match with another next data key for the potential duplicate data elements of the first group of data elements, the potential duplicate data element remains identified as a potential duplicate data element;
         iii) operations d)(i)-d(ii) are repeated recursively until no potential duplicate data elements remain or until at least two potential duplicate data elements are identified that match all N data keys and said data elements are identified as duplicates;

3) repeating operations 2)(a), (2)(b), 2)(c), 2)(d)(i)-(iii) for each of the remaining groups until all duplicate data elements, if any, are identified; and e) identifying duplicate data elements.

2. The method of claim 1 wherein c) obtaining intermediate data values for each of the data elements comprises summing the data bits of the data elements to obtain a non-binary numeric intermediate data value for each data element.

3. The method of claim 2 wherein the operation of obtaining an intermediate data value comprises summing the data bits to determine a decimal value for each data element.

4. The method of claim 1 wherein c) obtaining the intermediate data values for each of the data elements comprises:
   determining a numeric key value for each data key; and
   summing together all of the numeric key values for each data element to generate a single intermediate value for each data element.

5. The method of claim 1 wherein a) receiving the data set comprises providing a sequence of randomly generated data elements.

6. The method of claim 1 wherein the data set is generated by a random number generating process, the result of which is provided as a sequence of data elements and wherein the position in the sequence of each duplicate data element is tracked and is used to analyze the data set and the methods used to generate the data set.

7. The method of claim 6 wherein the position in the sequence of each duplicate data element is tracked and is used to troubleshoot the random number generation method used to produce the data set.

8. The method of claim 1 wherein a) receiving the data set comprises providing a data set comprising 256-bit data elements.

9. The method of claim 8 wherein b) dividing each data element into N data segments comprises dividing the 256-bit words into sixteen, 16-bit segments.

10. The method of claim 1 wherein a) receiving the data set comprises providing a data set having data elements with word lengths of 256-bits or larger.

11. The method of claim 1 wherein a) receiving the data set comprises providing a data set that is a sequence of authentication codes.

12. The method of claim 1 wherein the duplicates are removed from the data set and the remaining unique portions of the data set are provided as data set confirmed as having no duplicates.

13. The method of claim 1 wherein a) receiving a data set having a plurality of data elements comprises receiving a data set having at least one million data elements.

14. A computer program product embodied on a tangible computer readable storage media including computer program code for determining if the data of a data set includes duplicate data elements, the computer program product including:
   computer program code instructions for a) receiving a data set having a plurality of data elements;
   computer program code instructions for b) dividing each data element into N data segments defining thereby N data keys for each data element;
   computer program code instructions for c) obtaining intermediate data values for each of the data elements by summing the data bits of the data segments to obtain a non-binary numeric intermediate data value for each data segment;

computer program code instructions for d) sorting the data elements using at least the intermediate data values said instructions including:

1) segregating data elements into groups of data elements wherein each group is comprised of potential duplicate data elements having a same intermediate value;

2) beginning with a first group of the groups of data elements, data key sorting comprises:
   a) comparing a first data key for each data element in the first group;
   b) where the first data key of a data element does not match any other first data keys for the first group of data elements the data element is identified as unique and no further processing is performed on the data element;
   c) where the first data key of a data element matches the first data key of another data element of the first group, the data element remains identified as a potential duplicate data element and further processing is performed on the data element;
   d) the remaining potential duplicate data elements are subject to further processing as follows:
      i) comparing a next data key for each potential data element in the first group, where the potential duplicate data element does not match any of the next data keys for the potential duplicate data elements of the first group of data elements, the potential duplicate data element is identified as unique and no further processing is performed on the data element; and
      ii) if the next data key of the potential duplicate data element does match with another next data key for the potential duplicate data elements of the first group of data elements, the potential duplicate data element remains identified as a potential duplicate data element;
      iii) operations d)(i)-d(ii) are repeated recursively until no potential duplicate data elements remain or until at least two potential duplicate data elements are identified that match all N data keys and said data elements are identified as duplicates;

3) repeating operations (2)(a), (2)(b), (2)(c), & (2)(d)(i)-(iii) for each of the remaining groups until all duplicate data elements, if any, are identified; and computer program code instructions for e) identifying duplicate data elements.

15. The computer program product of claim 14 wherein the wherein the data set is provided as a sequence of data elements and wherein the position in the sequence of each duplicate data element is tracked and is used to troubleshoot data generation methods used to produce the data set.

16. The computer program product of claim 14 wherein the instructions for summing the data bits to obtain intermediate values comprises summing to determine a decimal value for each intermediate data value.

17. A computer system comprising a memory and a processor that executes
   a) receiving a data set having a plurality of data elements;
   b) dividing each data element into N data segments defining thereby N data keys for each data element;
   c) obtaining intermediate data values for each of the data elements by summing the data bits of the data segments to obtain a non-binary numeric intermediate data value for each data segment;

d) sorting the data elements using at least the intermediate data values said instructions including:
  1) segregating data elements into groups of data elements wherein each group is comprised of potential duplicate data elements having a same intermediate value;
  2) beginning with a first group of the groups of data elements, data key sorting comprises:
     a) comparing a first data key for each data element in the first group;
     b) where the first data key of a data element does not match any other first data keys for the first group of data elements the data element is identified as unique and no further processing is performed on the data element;
     c) where the first data key of a data element matches the first data key of another data element of the first group, the data element remains identified as a potential duplicate data element and further processing is performed on the data element;
     d) the remaining potential duplicate data elements are subject to further processing as follows:
        i) comparing a next data key for each potential data element in the first group, where the potential duplicate data element does not match any of the next data keys for the potential duplicate data elements of the first group of data elements, the potential duplicate data element is identified as unique and no further processing is performed on the data element; and
        ii) if the next data key of the potential duplicate data element does match with another next data key for the potential duplicate data elements of the first group of data elements, the potential duplicate data element remains identified as a potential duplicate data element;
        iii) operations d)(i)-d(ii) are repeated recursively until no potential duplicate data elements remain or until at least two potential duplicate data elements are identified that match all N data keys and said data elements are identified as duplicates;
  3) repeating operations (2)(a), (2)(b), (2)(c), & (2)(d)(i)-(iii) for each of the remaining groups until all duplicate data elements, if any, are identified; and
e) identifying duplicate data elements.

* * * * *